US012535320B2

(12) United States Patent
Wu et al.

(10) Patent No.: US 12,535,320 B2
(45) Date of Patent: Jan. 27, 2026

(54) RESONANT OPTICAL GYROSCOPE WITH A BROADBAND LIGHT SOURCE AND RIN REDUCTION TECHNIQUES

(71) Applicant: Honeywell International Inc., Charlotte, NC (US)

(72) Inventors: Jianfeng Wu, Tucson, AZ (US); Tiequn Qiu, Glendale, AZ (US); Steven Tin, Edina, MN (US); Glen A. Sanders, Scottsdale, AZ (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 371 days.

(21) Appl. No.: 18/316,086

(22) Filed: May 11, 2023

(65) Prior Publication Data
US 2024/0377199 A1 Nov. 14, 2024

(51) Int. Cl.
*G01C 19/72* (2006.01)
*G02B 6/12* (2006.01)

(52) U.S. Cl.
CPC ......... *G01C 19/721* (2013.01); *G01C 19/726* (2013.01); *G01C 19/727* (2013.01);
(Continued)

(58) Field of Classification Search
CPC .................................................. G01C 19/727
See application file for complete search history.

(56) References Cited

U.S. PATENT DOCUMENTS 5,898,496 A 4/1999 Huang et al.
6,370,289 B1 4/2002 Bennett
(Continued)

FOREIGN PATENT DOCUMENTS

CN 103697877 B 8/2019

OTHER PUBLICATIONS

European Patent Office, "Extended European Search Report", dated Oct. 7, 2024, from U.S. Appl. No. 18/316,086, from Foreign Counterpart to U.S. Appl. No. 18/316,086, pp. 1 through 7, Published: EP.

(Continued)

*Primary Examiner* — Rufus L Phillips
(74) *Attorney, Agent, or Firm* — Fogg & Powers LLC

(57) ABSTRACT

A gyroscope comprises a source emitting a broadband beam, and a first waveguide arrangement that splits the beam into CCW and CW beams. First and second phase modulators are coupled to the waveguide arrangement and provide phase modulations or frequency shifts to the CCW and CW beams. An optical resonator is in communication with the phase modulators such that the CCW and CW beams are optically coupled into the resonator. A second waveguide arrangement receives the CCW and CW beams transmitted from the resonator. First and second RIN detectors are coupled to the second waveguide arrangement and respectively receive the CCW and CW beams. A rate detector receives the CCW and CW beams. A rate calculation unit receives intensity noise signals from the RIN detectors, and rate and intensity noise signals from the rate detector. The rate calculation unit performs a RIN subtraction technique to reduce intensity noise limited ARW.

15 Claims, 3 Drawing Sheets

(52) U.S. Cl.
CPC .............. *G02B 6/12014* (2013.01); *G02B 2006/12138* (2013.01); *G02B 2006/12142* (2013.01); *G02B 2006/12157* (2013.01)

(56) References Cited

U.S. PATENT DOCUMENTS

| | | | |
|---|---|---|---|
| 6,763,153 | B2 | 7/2004 | Bennett |
| 6,836,334 | B2 | 12/2004 | Bennett |
| 7,142,355 | B2 | 11/2006 | Huang et al. |
| 7,586,619 | B2 | 9/2009 | Strandjord et al. |
| 10,731,988 | B1 * | 8/2020 | Paniccia ............ G02B 6/12019 |
| 2010/0284018 | A1 * | 11/2010 | Qiu ..................... G01C 19/721 356/464 |
| 2012/0113432 | A1 | 5/2012 | Smith et al. |
| 2015/0316382 | A1 | 11/2015 | Sanders et al. |
| 2019/0101392 | A1 * | 4/2019 | Bischel ............... G01C 19/726 |
| 2023/0030335 | A1 | 2/2023 | Kozuma |

OTHER PUBLICATIONS

Moeller et al. "LPG wavelength compensated, polarised, amplified, reduced RIN, broadband fibre optic source for precision fibre optic gyroscopes", Electronics Letters, Jan. 4, 2001, vol. 37, No. 1, p. 1 through 1.

Liu et al., "Performance of a resonant fiber-optic gyroscope based on a broadband source", Applied Optics, vol. 61, No. 16, May 27, 2022, pp. 4971 through 4979.

Liu et al., "Reduction of relative intensity noise in a broadband source-driven RFOG using a high-frequency modulation technique", Optics Letters, vol. 47, No. 19, Sep. 27, 2022, pp. 5100 through 5103.

Takei et al., "Simultaneous Suppression of Thermal Phase Noise and Relative Intensity Noise Fiber Optic Gyroscope", Physics Optics, arXiv:2208.11213v3, Dec. 23, 2022, pp. 1 through 7.

Zhang et al., "Fiber optic gyroscope noise reduction with fiber ring resonator", Applied Optics, vol. 57, No. 25, Aug. 31, 2018, Pages cover through 7397.

Zhao et al., "Navigation-grade resonant fiber-optic gyroscope using ultra-simple white-light multibeam interferometry", Photonics Research, vol. 10, No. 2, Feb. 1, 2022, pp. 542 through 549.

Zhao et al., "White-light-driven resonant fiber-optic gyro based on round trip filtering scheme", Optics Letters, vol. 47, No. 51, Feb. 22, 2022, pp. 1137 through 1140.

* cited by examiner

RESONANT OPTICAL GYROSCOPE WITH A BROADBAND LIGHT SOURCE AND RIN REDUCTION TECHNIQUES

BACKGROUND

The resonant optical gyroscope often requires narrow linewidth lasers for rate interrogation. One or multiple narrow linewidth lasers can be used to lock to the cavity resonances in the gyroscope. The rotation rate is determined by comparing the resonance shift between clockwise (CW) and counterclockwise (CCW) beam directions.

In addition, the system bias performance is limited by the Kerr effect. For example, the Kerr effect can limit the bias performance of a resonator fiber optic gyroscope (RFOG). The Kerr effect is caused by the different phase shifts between counter propagating beams due to the self-phase modulation (SPM) and cross-phase modulation (XPM), and is more prominent with narrow linewidth lasers.

The Kerr effect becomes even more significant for integrated photonics gyroscopes. Due to their small scale factor, integrated photonics gyroscopes have very high finesses to reduce the cavity linewidth and increase the gyroscope sensitivity. Therefore, the intracavity intensity is much higher than the intensity in traditional RFOGs.

SUMMARY

A gyroscope comprises a light source configured to emit a light beam with a broadband spectrum, and a first waveguide arrangement in optical communication with the light source, the first waveguide arrangement configured to split the light beam into a CCW beam and a CW beam. A first phase modulator is optically coupled to the first waveguide arrangement, with the first phase modulator configured to receive the CCW beam and provide a phase modulation or frequency shift to the CCW beam. A second phase modulator is optically coupled to the first waveguide arrangement, with the second phase modulator configured to receive the CW beam and provide a phase modulation or frequency shift to the CW beam. An optical resonator is in optical communication with the first phase modulator and the second phase modulator through the first waveguide arrangement. The CCW beam is optically coupled into the optical resonator and propagates in a CCW direction in the optical resonator, and the CW beam is optically coupled into the optical resonator and propagates in a CW direction in the optical resonator. A second waveguide arrangement is optically coupled to the optical resonator, with the second waveguide arrangement configured to receive the CCW beam and the CW beam transmitted from the optical resonator. A first relative intensity noise (RIN) detector is optically coupled to the second waveguide arrangement and configured to receive the CCW beam. A second RIN detector is optically coupled to the second waveguide arrangement and configured to receive the CW beam. A rate detector is optically coupled to the second waveguide arrangement, with the rate detector configured to receive combined portions of the CCW and CW beams from the second waveguide arrangement. A rate calculation unit is configured to receive a first intensity noise signal from the first RIN detector and a second intensity noise signal from the second RIN detector. The rate calculation unit is further configured to receive a rate and intensity noise signal from the rate detector. The rate calculation unit is operative to perform a RIN subtraction technique to reduce intensity noise limited Angle Random Walk (ARW), and to calculate a rotation rate signal for the gyroscope.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail using the accompanying drawings, in which.

DETAILED DESCRIPTION

Figure 1:
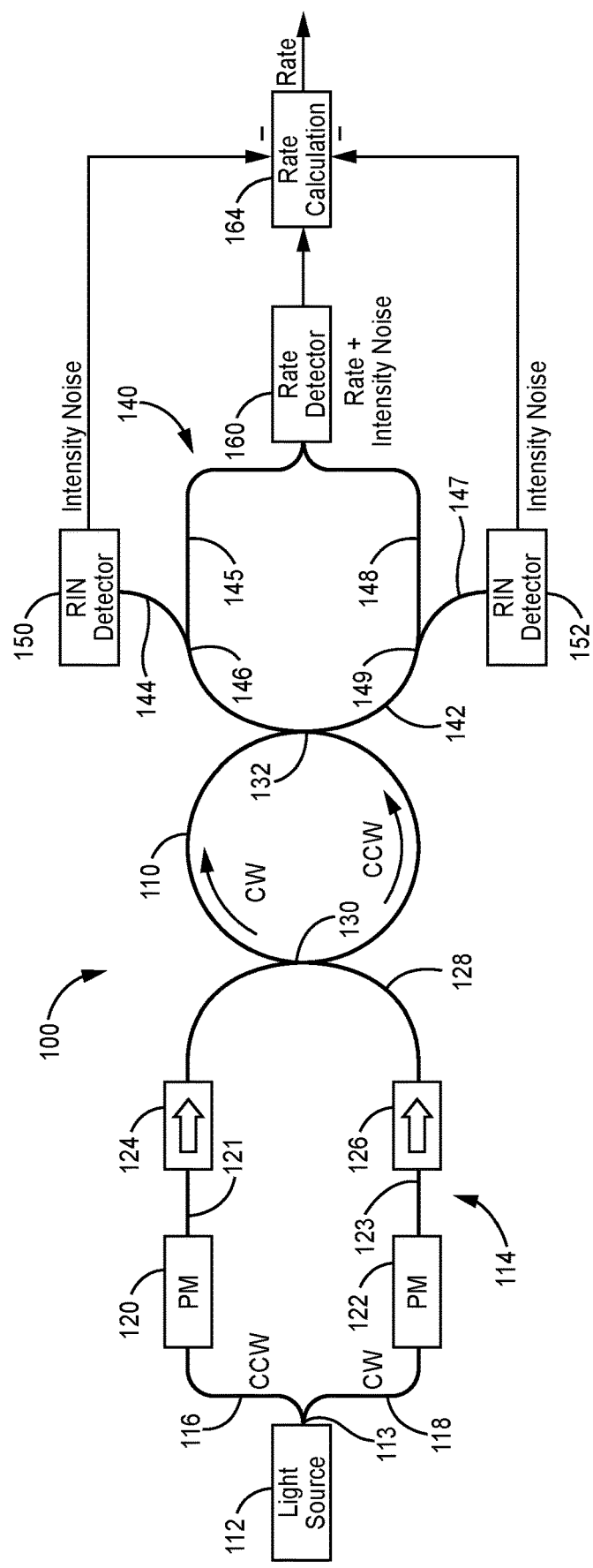
FIG. 1 is a schematic diagram of a resonant optical gyroscope, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various resonant optical gyroscopes with broadband light sources and relative intensity noise (RIN) reduction techniques are described herein.

Prior approaches for resonant optical gyroscopes rely on narrow linewidth lasers and resonance locking loops for rate detection, which is complicated and expensive. The present approach reduces the complexity and cost by using a broadband light source. In addition, navigation-grade resonant optical gyroscopes using a broadband light source can be implemented by the present techniques.

The present approach provides much simpler and less expensive resonant optical gyroscopes compared to traditional RFOG configurations that use lower-noise lasers. Transmission ports are used for interference in order to eliminate noisy light that does not carry the rotation signal. The broadband light that does not overlap with the resonance peaks is rejected by the resonator and does not carry any rotation information. If reflection ports are used to measure the interference, both the sensing signal and background light fall onto the same detector, which leads to less signal-to-noise reduction. The RIN reduction techniques can be implemented with RIN servos or RIN subtraction to improve the RIN limited Angle Random Walk (ARW).

In addition, the present system designs eliminate the use of circulators, which is useful for on-chip gyroscope applications. As the present system designs do not require circulators, it is possible to provide photonics gyroscope integration on a single chip. The broadband light source significantly reduces the bias instability due to the Kerr effect.

Further, the present resonant optical gyroscopes with broadband light sources can significantly reduce size, weight, power, and cost (SWaP-C) when implemented as navigation-grade gyroscopes. Also, the present techniques can be used in complementary metal-oxide-semiconductor (CMOS) compatible integrated circuit manufacturing to fabricate integrated photonics gyroscopes, providing significant cost reductions.

In various embodiments, a resonant optical gyroscope is based on an optical ring resonator with two output couplers, and a broadband light source. The output of the broadband light source is split into two outputs as clockwise (CW) and counterclockwise (CCW) beams. One or two isolators can be used to prevent disturbance from back-reflection of the light. Each beam passes a phase modulator to provide for phase modulation or frequency shift. Various modulation schemes can be used to improve the signal-to-noise ratio. After the light passes through the optical ring resonator, each of the CW and CCW beams acquires a phase shift due to resonator delay. The CW and CCW beams have different phase shifts due to the Sagnac effect. The transmitted CW and CCW beams are coupled out at a transmission port and then mixed with a coupler, and a beat signal is used for rate calculation. Two RIN detectors can be placed between the CW and CCW resonator output and a rate detector. Intensity servos or RIN subtraction techniques can be used to reduce the intensity noise limited ARW.

Further details regarding the present approach are described as follows and with reference to the drawings.

FIG. 1 is a schematic illustration of a resonant optical gyroscope 100, according to one embodiment. The gyroscope 100 generally includes an optical resonator 110, such as a waveguide ring resonator, which is in optical communication with a light source 112 configured to emit a light beam with a broadband spectrum. The optical resonator 110 is in optical communication with light source 112 through an optical path having a plurality of optical components. The optical resonator 110 can be implemented as a fiber ring resonator, or as a planar waveguide ring resonator. The various optical components of gyroscope 100 can be connected though optical fibers, or can be integrated on a single photonics chip using planar waveguides.

In one embodiment, light source 112 can be an amplified spontaneous emission (ASE) device, such as a superluminescent diode (SLD), or an Erbium-doped fiber amplifier, which are configured to emit a light beam with a broadband spectrum. In some embodiments, two or more SLDs with different center wavelengths can be combined to increase the power and bandwidth of the emitted light.

A first waveguide arrangement 114 is in optical communication with light source 112, with first waveguide arrangement 114 configured to split the light beam into a CCW beam and a CW beam. The first waveguide arrangement 114 can be implemented with optical fibers, planar waveguides, or combinations thereof.

A first phase modulator (PM) 120 is optically coupled to first waveguide arrangement 114, with first phase modulator 120 configured to receive the CCW beam and provide a phase modulation or frequency shift to the CCW beam. A second phase modulator 122 is optically coupled to first waveguide arrangement 114, with second phase modulator 122 configured to receive the CW beam and provide a phase modulation or frequency shift to the CW beam.

The optical resonator 110 is in optical communication with first phase modulator 120 and second phase modulator 122 through first waveguide arrangement 114. The CCW beam from first phase modulator 120 is optically coupled into optical resonator 110 via a first coupling region 130 and propagates in a CCW direction in optical resonator 110. The CW beam from second phase modulator 122 is optically coupled into optical resonator 110 via first coupling region 130 and propagates in a CW direction in optical resonator 110.

In one embodiment, a first optical isolator 124 can be optically coupled to first waveguide arrangement 114 between first phase modulator 120 and optical resonator 110. Also, a second optical isolator 126 can be optically coupled to first waveguide arrangement 114 between second phase modulator 122 and optical resonator 110.

In one example implementation, first waveguide arrangement 114 comprises a first coupler 113 that evenly splits an output of light source 112 and couples the split output with a first waveguide 116 and a second waveguide 118. The first waveguide 116 is optically coupled between light source 112 and an input port of first phase modulator 120. The second waveguide 118 is optically coupled between light source 112 and an input port of second phase modulator 122. A third waveguide 121 is optically coupled between an output port of first phase modulator 120 and an input port of first optical isolator 124, and a fourth waveguide 123 is optically coupled between an output port of second phase modulator 122 and an input port of second optical isolator 126. A first coupling waveguide 128 is optically coupled to optical resonator 110 at first coupling region 130 on a first side of optical resonator 110. An output port of first optical isolator 124 and an output port of second optical isolator 126 are in optical communication with optical resonator 110 through first coupling waveguide 128.

In addition, a second waveguide arrangement 140 is optically coupled to optical resonator 110. The second waveguide arrangement 140 configured to receive a portion of the CCW beam and a portion of the CW beam from optical resonator 110. The second waveguide arrangement 140 can be implemented with optical fibers, planar waveguides, or combinations thereof.

In one example implementation, second waveguide arrangement 140 comprises a second coupling waveguide 142 optically coupled to optical resonator 110 at a second coupling region 132 on a second side of optical resonator 110. The second coupling waveguide 142 is split into a first waveguide branch 144 and a second waveguide branch 145 at a third coupling region 146. The second coupling waveguide 142 is also split into a third waveguide branch 147 and a fourth waveguide branch 148 at a fourth coupling region 149. The CW and CCW beams are transmitted from optical resonator 110 at second coupling region 132, which is configured to reject any light that does not overlap with resonance peaks of optical resonator 110.

A first RIN detector 150 is optically coupled to second waveguide arrangement 140, with first RIN detector 150 configured to receive the first portion of the CCW beam from optical resonator 110. A second RIN detector 152 is also optically coupled to second waveguide arrangement 140, with second RIN detector 152 configured to receive the portion of the CW beam from optical resonator 110.

In one example implementation, an input port of first RIN detector 150 is in optical communication with optical resonator 110 through second coupling waveguide 142 and first waveguide branch 144. An input port of second RIN detector 152 is in optical communication with optical resonator 110 through second coupling waveguide 142 and third waveguide branch 147.

A rate detector 160 is optically coupled with second waveguide arrangement 140, with rate detector 160 configured to receive combined portions of the CCW and CW beams from second waveguide arrangement 140. In one example implementation, an input port of rate detector 160 is in optical communication with optical resonator 110 through second coupling waveguide 142, second waveguide branch 145, and fourth waveguide branch 148. The second waveguide branch 145 and fourth waveguide branch 148 are coupled together at the input port of rate detector 160.

A rate calculation unit 164 is configured to receive a first intensity noise signal from first RIN detector 150 and a second intensity noise signal from second RIN detector 152. The rate calculation unit 164 is also configured to receive a rate and intensity noise signal from rate detector 160. The rate calculation unit 164 is operative to calculate a rotation rate signal for gyroscope 100 based on the interference signal from rate detector 160 and RIN noise signals from RIN detectors 150, 152. In addition, rate calculation unit 164 is operative to perform a RIN subtraction technique based on the received signals to reduce intensity noise limited ARW.

During operation of gyroscope 100, light source 112 emits a light beam with a broadband spectrum, which is split into the CCW beam that is fed into first waveguide 116, and the CW beam that is fed into second waveguide 118. The CCW beam in first waveguide 116 is directed to first phase modulator 120, which provides a phase modulation or frequency shift to the CCW beam. The CCW beam is then directed from first phase modulator 120 by third waveguide 121 to first optical isolator 124, which outputs the CCW beam to first coupling waveguide 128. The CW beam in second waveguide 118 is directed to second phase modulator 122, which provides a phase modulation or frequency shift to the CW beam. The CW beam is then directed from second phase modulator 122 by fourth waveguide 123 to second optical isolator 126, which outputs the CW beam to first coupling waveguide 128.

Various modulation schemes can be implemented using phase modulators 120, 122 to improve the signal-to-noise ratio. The optical isolators 124, 126 prevent various deleterious effects from potential optical feedback, such as disturbance from back reflection of the light beams from optical resonator 110.

The CW beam is sent to optical resonator 110 through first coupling waveguide 128, which couples the CW beam into optical resonator 110 at first coupling region 130, such that the CW beam propagates in a CW direction in optical resonator 110. The CCW beam is also sent to optical resonator 110 through first coupling waveguide 128, which couples the CCW beam into optical resonator 110 at first coupling region 130, such that the CCW beam propagates in a CCW direction in optical resonator 110.

The CCW beam circulating in optical resonator 110 is coupled out of optical resonator 110 into second coupling waveguide 142 at second coupling region 132. A first portion of the CCW beam is coupled into first waveguide branch 144 from second coupling waveguide 142 at third coupling region 146 and directed to first RIN detector 150. The first RIN detector 150 converts the received CCW beam into the first intensity noise signal, which is sent to rate calculation unit 164.

In addition, the CW beam circulating in optical resonator 110 is coupled out of optical resonator 110 into second coupling waveguide 142 at second coupling region 132. A first portion of the CW beam is coupled into third waveguide branch 147 from second coupling waveguide 142 at fourth coupling region 149 and directed to second RIN detector 152. The second RIN detector 152 converts the received CW beam into the second intensity noise signal, which is sent to rate calculation unit 164.

Further, a second portion of the CCW beam is coupled into second waveguide branch 145 from second coupling waveguide 142 at third coupling region 146 and directed to rate detector 160. Likewise, a second portion of the CW beam is coupled into fourth waveguide branch 148 from second coupling waveguide 142 at fourth coupling region 149 and directed to rate detector 160.

After the CW and CCW beams have passed through optical resonator 110, each of the CW and CCW beams acquires a phase shift due to resonator delay. The CW and CCW beams have different phase shifts due to the Sagnac effect. The CW and CCW beams are coupled together and mixed at the input port of rate detector 160, and a beat signal is used for rate calculation.

The intensity noise signals from RIN detectors 150, 152 are sent to rate calculation unit 164, along with the rate and intensity noise signal from rate detector 160. A RIN subtraction technique is used by rate calculation unit 164 to reduce the intensity noise limited ARW. In this technique, the intensity noise signals from RIN detectors 150, 152 are used by rate calculation unit 164 to subtract the intensity noise from the rate signal received from rate detector 160. For example, the intensity noise can be subtracted from the rate signal using intensity signals at a demodulation frequency provided by the first and second intensity noise signals from first and second RIN detectors 150, 152.

Figure 2:
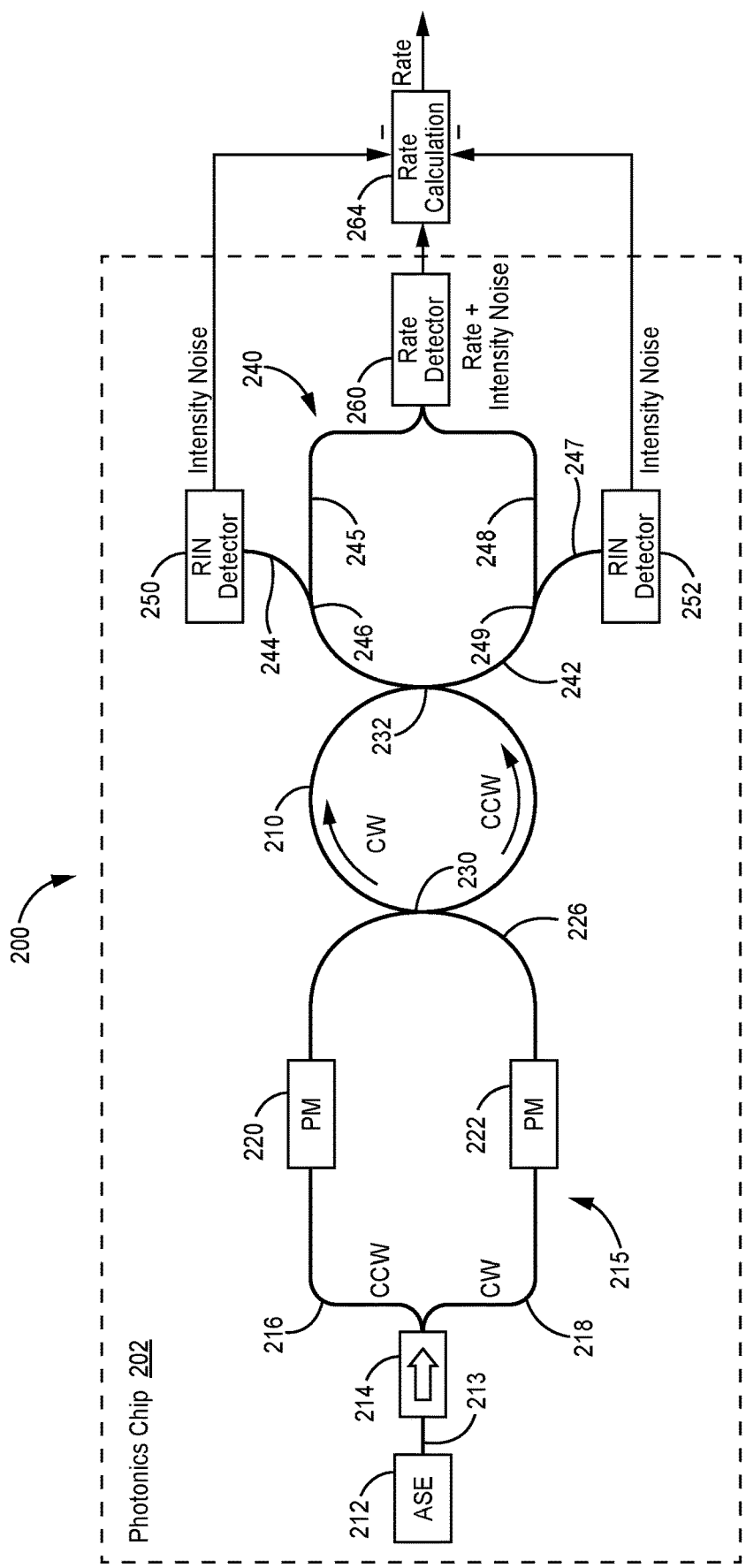
FIG. 2 is a schematic diagram of a resonant optical gyroscope, according to another embodiment.

FIG. 2 is a schematic illustration of a resonant optical gyroscope 200, according to another embodiment. The gyroscope 200 generally includes an optical resonator 210, such as a waveguide ring resonator, which is in optical communication with a broadband light source 212 through an optical path having a plurality of optical components. The various optical components of gyroscope 200 can be connected though optical fibers or can be integrated on a photonics chip. For example, when optical resonator 210 is formed as a planar waveguide ring resonator, the various optical components of gyroscope 200 can be integrated on a single photonics chip 202 with planar waveguides using standard microfabrication processes.

In one embodiment, light source 212 can be an ASE device, such as a SLD. In some embodiments, two or more SLDs with different center wavelengths can be combined to increase the power and bandwidth of the emitted light beam.

An optical isolator 214 is optically coupled between light source 212 and a first waveguide arrangement 215, which is configured to split the light beam into a CCW beam and a CW beam. An input waveguide 213 can be optically coupled between light source 212 and optical isolator 214. The first waveguide arrangement 215 can be implemented with planar waveguides, for example.

A first phase modulator 220 is optically coupled to first waveguide arrangement 215, with first phase modulator 220 configured to receive the CCW beam and provide a phase modulation and/or frequency shift to the CCW beam. A second phase modulator 222 is optically coupled to first waveguide arrangement 215, with second phase modulator 222 configured to receive the CW beam and provide a phase modulation and/or frequency shift to the CW beam.

The optical resonator 210 is in optical communication with first phase modulator 220 and second phase modulator 222 through first waveguide arrangement 215. The CCW beam from first phase modulator 220 is optically coupled into optical resonator 210 and propagates in a CCW direction in optical resonator 210. The CW beam from second phase modulator 222 is optically coupled into optical resonator 210 and propagates in a CW direction in optical resonator 210.

In one example implementation, first waveguide arrangement 215 comprises a first waveguide 216 optically coupled between an output port of optical isolator 214 and an input port of first phase modulator 220, and a second waveguide 218 optically coupled between the output port of optical isolator 214 and an input port of second phase modulator 222. In particular, the output port of optical isolator 214 is split between first waveguide 216 and second waveguide 218. A first coupling waveguide 226 is optically coupled to optical resonator 210 at a first coupling region 230 on a first side of optical resonator 210. An output port of first phase modulator 220 and an output port of second phase modulator 222 are in optical communication with optical resonator 210 through first coupling waveguide 226.

In addition, a second waveguide arrangement 240 is optically coupled to optical resonator 210. The second waveguide arrangement 240 is configured to receive a portion of the CCW beam and a portion of the CW beam from optical resonator 210. The second waveguide arrangement 240 can be implemented with planar waveguides, for example.

In one example implementation, second waveguide arrangement 240 comprises a second coupling waveguide 242 optically coupled to optical resonator 210 at a second coupling region 232 on a second side of optical resonator 210. The second coupling waveguide 242 is split into a first waveguide branch 244 and a second waveguide branch 245 at a third coupling region 246. The second coupling waveguide 242 is also split into a third waveguide branch 247 and a fourth waveguide branch 248 at a fourth coupling region 249.

A first RIN detector 250 is optically coupled to second waveguide arrangement 240, with first RIN detector 250 configured to receive the CCW beam from optical resonator 210. A second RIN detector 252 is also optically coupled to second waveguide arrangement 240, with second RIN detector 252 configured to receive the CW beam from optical resonator 210.

In one example implementation, an input port of first RIN detector 250 is in optical communication with optical resonator 210 through second coupling waveguide 242 and first waveguide branch 244. An input port of second RIN detector 252 is in optical communication with optical resonator 210 through second coupling waveguide 242 and third waveguide branch 247.

A rate detector 260 is optically coupled with second waveguide arrangement 240, with rate detector 260 configured to receive combined portions of the CCW and CW beams from second waveguide arrangement 240. In one example implementation, an input port of rate detector 260 is in optical communication with optical resonator 210 through second coupling waveguide 242, second waveguide branch 245, and fourth waveguide branch 248. The second waveguide branch 245 and fourth waveguide branch 248 are coupled together at the input port of rate detector 260.

A rate calculation unit 264, which is located off of photonics chip 202, is configured to receive a first intensity noise signal from first RIN detector 250 and a second intensity noise signal from second RIN detector 252. The rate calculation unit 264 is also configured to receive a rate and intensity noise signal from rate detector 260. The rate calculation unit 264 is operative to calculate a rotation rate signal for gyroscope 200 based on the interference signal from rate detector 260 and RIN noise signals from RIN detectors 250, 252. In addition, rate calculation unit 264 is operative to perform a RIN subtraction technique based on the received signals to reduce intensity noise limited ARW.

During operation of gyroscope 200, light source 212 emits a light beam that is directed to optical isolator 214. The light beam output from optical isolator 214 is split into a CCW beam that is fed into first waveguide 216, and a CW beam that is fed into second waveguide 218. The CCW beam in first waveguide 216 is directed to first phase modulator 220, which provides a phase modulation and/or frequency shift to the CCW beam. The CCW beam from first phase modulator 220 is directed to first coupling waveguide 226. The CW beam in second waveguide 218 is directed to second phase modulator 222, which provides a phase modulation and/or frequency shift to the CW beam. The CW beam from second phase modulator 222 is also directed to first coupling waveguide 226.

The CW beam is sent to optical resonator 210 through first coupling waveguide 226, which couples the CW beam into optical resonator 210 at first coupling region 230, such that the CW beam propagates in a CW direction in optical resonator 210. The CCW beam is also sent to optical resonator 210 through first coupling waveguide 226, which couples the CCW beam into optical resonator 210 at first coupling region 230, such that the CCW beam propagates in a CCW direction in optical resonator 210.

The CCW beam circulating in optical resonator 210 is coupled out of optical resonator 210 into second coupling waveguide 242 at second coupling region 232. A first portion of the CCW beam is coupled into first waveguide branch 244 from second coupling waveguide 242 at third coupling region 246 and directed to first RIN detector 250. The first RIN detector 250 converts the received CCW beam into the first intensity noise signal, which is sent to rate calculation unit 264.

In addition, the CW beam circulating in optical resonator 210 is coupled out of optical resonator 210 into second coupling waveguide 242 at second coupling region 232. A first portion of the CW beam is coupled into third waveguide branch 247 from second coupling waveguide 242 at fourth coupling region 249 and directed to second RIN detector 252. The second RIN detector 252 converts the received CW beam into the second intensity noise signal, which is sent to rate calculation unit 264.

Further, a second portion of the CCW beam is coupled into second waveguide branch 245 from second coupling waveguide 242 at third coupling region 246 and directed to rate detector 260. Likewise, a second portion of the CW beam is coupled into fourth waveguide branch 248 from second coupling waveguide 242 at fourth coupling region 249 and directed to rate detector 260.

After the CW and CCW beams have passed through optical resonator 210, each of the CW and CCW beams acquires a phase shift due to resonator delay. The CW and CCW beams have different phase shifts due to the Sagnac effect. The CW and CCW beams are coupled together and mixed at the input port of rate detector 260, and a beat signal is used for rate calculation.

The intensity noise signals from RIN detectors 250, 252 are sent to rate calculation unit 264, along with the rate and intensity noise signal from rate detector 260. A RIN subtraction technique is used by rate calculation unit 264 to reduce the intensity noise limited ARW. In this technique, the intensity noise signals from RIN detectors 250, 252 are used by rate calculation unit 264 to subtract the intensity noise from the rate signal received from rate detector 260. For example, the intensity noise signal can be subtracted from the rate signal using a difference provided by the first and second intensity noise signals from RIN detectors 250, 252.

Figure 3:
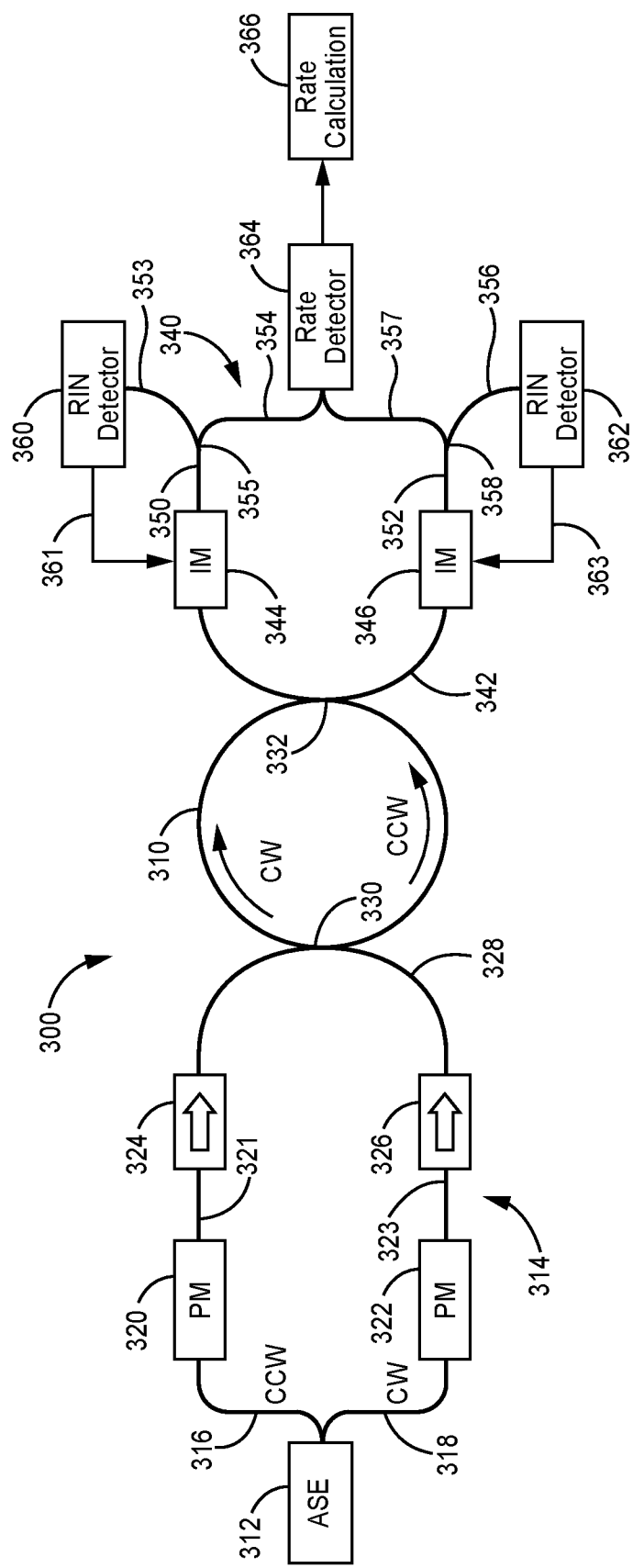
FIG. 3 is a schematic diagram of a resonant optical gyroscope, according to an alternative embodiment.

FIG. 3 is a schematic illustration of a resonant optical gyroscope 300, according to a further embodiment. The gyroscope 300 generally includes an optical resonator 310, such as a waveguide ring resonator, which is in optical communication with a broadband light source 312 through an optical path having a plurality of optical components. The optical resonator 310 can be implemented as a fiber ring resonator, or as a planar waveguide ring resonator. The various optical components of gyroscope 300 can be connected though optical fibers or can be integrated on a single photonics chip.

In one embodiment, light source 312 can be an ASE device, such as a SLD. In some embodiments, two or more SLDs with different center wavelengths can be combined to increase the power and bandwidth of the emitted light beam.

A first waveguide arrangement 314 is in optical communication with light source 312, with first waveguide arrangement 314 configured to split the light beam into a CCW beam and a CW beam. The first waveguide arrangement 314 can be implemented with optical fibers, planar waveguides, or combinations thereof.

A first phase modulator 320 is optically coupled to first waveguide arrangement 314, with first phase modulator 320 configured to receive the CCW beam and provide a phase modulation or frequency shift to the CCW beam. A second phase modulator 322 is optically coupled to first waveguide arrangement 314, with second phase modulator 322 configured to receive the CW beam and provide a phase modulation or frequency shift to the CW beam.

The optical resonator 310 is in optical communication with first phase modulator 320 and second phase modulator 322 through first waveguide arrangement 314. The CCW beam from first phase modulator 320 is optically coupled into optical resonator 310 and propagates in a CCW direction in optical resonator 310. The CW beam from second phase modulator 322 is optically coupled into optical resonator 310 and propagates in a CW direction in optical resonator 310.

In one embodiment, a first optical isolator 324 can be optically coupled to first waveguide arrangement 314 between an output port of first phase modulator 320 and optical resonator 310. Also, a second optical isolator 326 can be optically coupled to first waveguide arrangement 314 between an output port of second phase modulator 322 and optical resonator 310.

In one example implementation, first waveguide arrangement 314 comprises a first waveguide 316 optically coupled between light source 312 and an input port of first phase modulator 320, and a second waveguide 318 optically coupled between light source 312 and an input port of second phase modulator 322. A third waveguide 321 is optically coupled between an output port of first phase modulator 320 and an input port of first optical isolator 324, and a fourth waveguide 323 is optically coupled between an output port of second phase modulator 322 and an input port of second optical isolator 326. A first coupling waveguide 328 is optically coupled to optical resonator 310 at a first coupling region 330 on a first side of optical resonator 310. An output port of first optical isolator 324 and an output port of second optical isolator 326 are in optical communication with optical resonator 310 through first coupling waveguide 328.

In addition, a second waveguide arrangement 340 is optically coupled to optical resonator 310. The second waveguide arrangement 340 is configured to receive a portion of the CCW beam and a portion of the CW beam from optical resonator 310. The second waveguide arrangement 340 can be implemented with optical fibers, planar waveguides, or combinations thereof. The second waveguide arrangement 340 comprises a second coupling waveguide 342 optically coupled to optical resonator 310 at a second coupling region 332 on a second side of optical resonator 310.

A first intensity modulator (IM) 344 is optically coupled to second waveguide arrangement 340, with first intensity modulator 344 configured to receive a portion of the CCW beam from optical resonator 310. A second intensity modulator 346 is also optically coupled to second waveguide arrangement 340, with second intensity modulator 346 configured to receive a portion of the CW beam from optical resonator 310.

In one example implementation, second coupling waveguide 342 is optically coupled to an input port of first intensity modulator 344 and an input port of second intensity modulator 346. In addition, second waveguide arrangement 340 further comprises a third coupling waveguide 350 optically coupled to an output port of first intensity modulator 344, and a fourth coupling waveguide 352 optically coupled to an output port of second intensity modulator 346. The third coupling waveguide 350 is split into a first waveguide branch 353 and a second waveguide branch 354 at a third coupling region 355. The fourth coupling waveguide 352 is split into a third waveguide branch 356 and a fourth waveguide branch 357 at a fourth coupling region 358.

A first RIN detector 360 is optically coupled to second waveguide arrangement 340, with first RIN detector 360 operatively coupled to first intensity modulator 344 to form a first RIN servo loop 361. A second RIN detector 362 is optically coupled to second waveguide arrangement 340, with second RIN detector 362 operatively coupled to second intensity modulator 346 in a second RIN servo loop 363. As discussed further hereafter, first and second RIN servo loops 361, 363 are operative to reduce intensity noise limited ARW for gyroscope 300.

In one example implementation, an input port of first RIN detector 360 is in optical communication with an output port of first intensity modulator 344 through third coupling waveguide 350 and first waveguide branch 353. An input port of second RIN detector 362 is in optical communication with an output port of second intensity modulator 346 through fourth coupling waveguide 352 and third waveguide branch 356.

A rate detector 364 is optically coupled with second waveguide arrangement 340, with rate detector 364 configured to receive combined portions of the CCW and CW beams from first and second intensity modulators 344, 346. A rate calculation unit 366 is configured to receive a rate signal from rate detector 364, and to calculate a rotation rate signal for gyroscope 300.

In one example implementation, an input port of rate detector 364 is in optical communication with an output port of first intensity modulator 344 through third coupling waveguide 350 and second waveguide branch 354. In addition, an input port of rate detector 364 is in optical communication with an output port of second intensity modulator 346 through fourth coupling waveguide 352 and fourth waveguide branch 357. The second waveguide branch 354 and fourth waveguide branch 557 are coupled together at the input port of rate detector 364.

During operation of gyroscope 300, light source 312 emits a light beam with a broadband spectrum, which is split into a CCW beam that is fed into first waveguide 316, and a CW beam that is fed into second waveguide 318. The CCW beam in first waveguide 316 is directed to first phase modulator 320, which provides a phase modulation or frequency shift to the CCW beam. The CCW beam is then directed from first phase modulator 320 by third waveguide 321 to first optical isolator 324, which outputs the CCW beam to first coupling waveguide 328. The CW beam in second waveguide 318 is directed to second phase modulator 322, which provides a phase modulation or frequency shift to the CW beam. The CW beam is then directed from second phase modulator 322 by fourth waveguide 323 to second optical isolator 326, which outputs the CW beam to first coupling waveguide 328.

The CW beam is sent to optical resonator 310 through first coupling waveguide 328, which couples the CW beam into optical resonator 310 at first coupling region 330, such that the CW beam propagates in a CW direction in optical resonator 310. The CCW beam is also sent to optical resonator 310 through first coupling waveguide 328, which couples the CCW beam into optical resonator 310 at first coupling region 330, such that the CCW beam propagates in a CCW direction in optical resonator 310.

The CCW beam circulating in optical resonator 310 is coupled out of optical resonator 310 into second coupling waveguide 342 at second coupling region 332. The first intensity modulator 344 receives the CCW beam from second coupling waveguide 342 and modulates an intensity of the CCW beam. This CCW beam is directed from first intensity modulator 344 into third coupling waveguide 350. A first portion of the CCW beam is coupled into first waveguide branch 353 from third coupling waveguide 350 at third coupling region 355 and directed to the input port of first RIN detector 360. A second portion of the CCW beam is coupled into second waveguide branch 354 from third coupling waveguide 350 at third coupling region 355 and directed to the input port of rate detector 364.

In addition, the CW beam circulating in optical resonator 310 is also coupled out of optical resonator 310 into second coupling waveguide 342 at second coupling region 332. The second intensity modulator 346 receives the CW beam from second coupling waveguide 342 and modulates an intensity of the CW beam. This CW beam is directed from second intensity modulator 346 into fourth coupling waveguide 352. A first portion of the CW beam is coupled into third waveguide branch 356 from fourth coupling waveguide 352 at fourth coupling region 358 and directed to the input port of second RIN detector 362. A second portion of the CW beam is coupled into fourth waveguide branch 357 from fourth coupling waveguide 352 at fourth coupling region 358 and directed to the input port of rate detector 364.

The first RIN detector 360 measures the intensity fluctuation of the CCW beam at its phase modulation frequency, and then uses this intensity fluctuation as an input error signal to feed into first RIN servo loop 361. An output signal of first RIN servo loop 361 is sent into first intensity modulator 344 to suppress the CCW intensity noise. This adjusts first intensity modulator 344 to reduce the intensity noise on the CCW beam launched into first intensity modulator 344. The second RIN detector 362 measures the intensity fluctuation of the CW beam at its phase modulation frequency, and then uses this intensity fluctuation as an input error signal to feed into second RIN servo loop 363. An output signal of second RIN servo loop 363 is sent into second intensity modulator 346 to suppress the CW intensity noise. This adjusts second intensity modulator 346 to reduce the intensity noise on the CW beam launched into second intensity modulator 344. Accordingly, first and second RIN servo loops 361, 363 are operative to reduce intensity noise limited ARW for gyroscope 300.

The CCW beam in second waveguide branch 354 and the CW beam in fourth waveguide branch 357 are combined at the input port of rate detector 364. The rotation of gyroscope 300 causes a Sagnac phase shift between the CW and CCW beams output by optical resonator 310, which is detected by rate detector 364. The rate detector 364 outputs a corresponding electrical signal that is demodulated and sent to rate calculation unit 366 for further processing to determine a rotation rate.

EXAMPLE EMBODIMENTS

Example 1 includes a gyroscope comprising: a light source configured to emit a light beam with a broadband spectrum; a first waveguide arrangement in optical communication with the light source, the first waveguide arrangement configured to split the light beam into a counterclockwise (CCW) beam and a clockwise (CW) beam; a first phase modulator optically coupled to the first waveguide arrangement, the first phase modulator configured to receive the CCW beam and provide a phase modulation or frequency shift to the CCW beam; a second phase modulator optically coupled to the first waveguide arrangement, the second phase modulator configured to receive the CW beam and provide a phase modulation or frequency shift to the CW beam; an optical resonator in optical communication with the first phase modulator and the second phase modulator through the first waveguide arrangement, wherein the CCW beam is optically coupled into the optical resonator and propagates in a CCW direction in the optical resonator, and the CW beam is optically coupled into the optical resonator and propagates in a CW direction in the optical resonator; a second waveguide arrangement optically coupled to the optical resonator, the second waveguide arrangement configured to receive the CCW beam and the CW beam transmitted from the optical resonator; a first relative intensity noise (RIN) detector optically coupled to the second waveguide arrangement and configured to receive the CCW beam; a second RIN detector optically coupled to the second waveguide arrangement and configured to receive the CW beam; a rate detector optically coupled to the second waveguide arrangement, the rate detector configured to receive combined portions of the CCW and CW beams from the second waveguide arrangement; and a rate calculation unit configured to receive a first intensity noise signal from the first RIN detector and a second intensity noise signal from the second RIN detector, the rate calculation unit further configured to receive a rate and intensity noise signal from the rate detector; wherein the rate calculation unit is operative to perform a RIN subtraction technique to reduce intensity noise limited Angle Random Walk (ARW), and to calculate a rotation rate signal for the gyroscope.

Example 2 includes the gyroscope of Example 1, wherein in the RIN subtraction technique, the intensity noise signal is subtracted from the rate using intensity signals at a demodulation frequency provided by the first and second intensity noise signals from the first and second RIN detectors.

Example 3 includes the gyroscope of any of Examples 1-2, wherein the rate detector is operative to detect a Sagnac phase shift between the CW and CCW beams in the optical resonator caused by rotation of the gyroscope.

Example 4 includes the gyroscope of any of Examples 1-3, wherein the light source comprises an amplified spontaneous emission device, an Erbium-doped fiber amplifier, a superluminescent diode, or two or more superluminescent diodes having different center wavelengths.

Example 5 includes the gyroscope of any of Examples 1-4, wherein the optical resonator comprises a waveguide ring resonator.

Example 6 includes the gyroscope of any of Examples 1-4, wherein the optical resonator comprises a fiber ring resonator.

Example 7 includes the gyroscope of any of Examples 1-4, wherein the optical resonator comprises a planar waveguide ring resonator.

Example 8 includes the gyroscope of any of Examples 1-7, further comprising: a first optical isolator optically coupled to the first waveguide arrangement between the first phase modulator and the optical resonator; and a second optical isolator optically coupled to the first waveguide arrangement between the second phase modulator and the optical resonator.

Example 9 includes the gyroscope of Example 8, wherein the first waveguide arrangement comprises: a first waveguide optically coupled between the light source and the first phase modulator; a second waveguide optically coupled between the light source and the second phase modulator; a third waveguide optically coupled between the first phase modulator and the first optical isolator; a fourth waveguide optically coupled between the second phase modulator and the second optical isolator; and a first coupling waveguide optically coupled to the optical resonator at a first coupling region on a first side of the optical resonator; wherein the first optical isolator and the second optical isolator are in optical communication with the optical resonator through the first coupling waveguide.

Example 10 includes the gyroscope of Example 9, wherein the second waveguide arrangement comprises: a second coupling waveguide optically coupled to the optical resonator at a second coupling region on a second side of the optical resonator; wherein the second coupling waveguide is split into a first waveguide branch and a second waveguide branch at a third coupling region, and split into a third waveguide branch and a fourth waveguide branch at a fourth coupling region; wherein the CW and CCW beams are transmitted from the optical resonator at the second coupling region, which rejects any light that does not overlap with resonance peaks of the optical resonator.

Example 11 includes the gyroscope of Example 10, wherein: the first RIN detector is in optical communication with the optical resonator through the second coupling waveguide and the first waveguide branch; the second RIN detector is in optical communication with the optical resonator through the second coupling waveguide and the third waveguide branch; and the rate detector is in optical communication with the optical resonator through the second coupling waveguide, the second waveguide branch, and the fourth waveguide branch; wherein the second waveguide branch and the fourth waveguide branch are coupled together at an input port of the rate detector.

Example 12 includes the gyroscope of any of Examples 1-7, further comprising an optical isolator optically coupled between the light source and the first waveguide arrangement.

Example 13 includes the gyroscope of Example 12, wherein the first waveguide arrangement comprises: a first waveguide optically coupled between the optical isolator and the first phase modulator; a second waveguide optically coupled between the optical isolator and the second phase modulator; and a first coupling waveguide optically coupled to the optical resonator at a first coupling region on a first side of the optical resonator; wherein the first phase modulator and the second phase modulator are in optical communication with the optical resonator through the first coupling waveguide.

Example 14 includes the gyroscope of Example 13, wherein the second waveguide arrangement comprises: a second coupling waveguide optically coupled to the optical resonator at a second coupling region on a second side of the optical resonator; wherein the second coupling waveguide is split into a first waveguide branch and a second waveguide branch at a third coupling region, and split into a third waveguide branch and a fourth waveguide branch at a fourth coupling region.

Example 15 includes the gyroscope of Example 14, wherein: the first RIN detector is in optical communication with the optical resonator through the second coupling waveguide and the first waveguide branch; the second RIN detector is in optical communication with the optical resonator through the second coupling waveguide and the third waveguide branch; and the rate detector is in optical communication with the optical resonator through the second coupling waveguide, the second waveguide branch, and the fourth waveguide branch; wherein the second waveguide branch and the fourth waveguide branch are coupled together at an input port of the rate detector.

Example 16 includes a gyroscope comprising: a light source configured to emit a light beam with a broadband spectrum; a first waveguide arrangement in optical communication with the light source, the first waveguide arrangement configured to split the light beam into a CCW beam and a CW beam; a first phase modulator optically coupled to the first waveguide arrangement, the first phase modulator configured to receive the CCW beam and provide a phase modulation or frequency shift to the CCW beam; a second phase modulator optically coupled to the first waveguide arrangement, the second phase modulator configured to receive the CW beam and provide a phase modulation or frequency shift to the CW beam; an optical resonator in optical communication with the first phase modulator and the second phase modulator through the first waveguide arrangement, wherein the CCW beam is optically coupled into the optical resonator and propagates in a CCW direction in the optical resonator, and the CW beam is optically coupled into the optical resonator and propagates in a CW direction in the optical resonator; a second waveguide arrangement optically coupled to the optical resonator, the second waveguide arrangement configured to receive the CCW beam and the CW beam from the optical resonator; a first intensity modulator optically coupled to the second waveguide arrangement, the first intensity modulator configured to a portion of the CCW beam from the optical resonator; a second intensity modulator optically coupled to the second waveguide arrangement, the second intensity modulator configured to receive a portion of the CW beam from the optical resonator; a first RIN detector optically coupled to the second waveguide arrangement, the first RIN detector operatively coupled to the first intensity modulator in a first RIN servo loop; a second RIN detector optically coupled to the second waveguide arrangement, the second RIN detector operatively coupled to the second intensity modulator in a second RIN servo loop; a rate detector optically coupled to the second waveguide arrangement, the rate detector configured to receive combined portions of the CCW and CW beams from the first and second intensity modulators; and a rate calculation unit configured to receive a rate signal from the rate detector, and calculate a rotation rate signal for the gyroscope; wherein the first and second RIN servo loops are operative to reduce intensity noise limited ARW for the gyroscope.

Example 17 includes the gyroscope of Example 16, further comprising: a first optical isolator optically coupled to the first waveguide arrangement between the first phase modulator and the optical resonator; and a second optical isolator optically coupled to the first waveguide arrangement between the second phase modulator and the optical resonator.

Example 18 includes the gyroscope of Example 17, wherein the first waveguide arrangement comprises: a first waveguide optically coupled between the light source and an input port of the first phase modulator; a second waveguide optically coupled between the light source and an input port of the second phase modulator; a third waveguide optically coupled between an output port of the first phase modulator and an input port of the first optical isolator; a fourth waveguide optically coupled between an output port of the second phase modulator and an input port of the second optical isolator; and a first coupling waveguide optically coupled to the optical resonator at a first coupling region on a first side of the optical resonator; wherein an output port of the first optical isolator and an output port of the second optical isolator are in optical communication with the optical resonator through the first coupling waveguide.

Example 19 includes the gyroscope of Example 18, wherein the second waveguide arrangement comprises: a second coupling waveguide optically coupled to the optical resonator at a second coupling region on a second side of the optical resonator, the second coupling waveguide optically coupled to an input port of the first intensity modulator and an input port of the second intensity modulator; a third coupling waveguide optically coupled to an output port of the first intensity modulator; and a fourth coupling waveguide optically coupled to an output port of the second intensity modulator; wherein the third coupling waveguide is split into a first waveguide branch and a second waveguide branch at a third coupling region, and the fourth coupling waveguide is split into a third waveguide branch and a fourth waveguide branch at a fourth coupling region.

Example 20 includes the gyroscope of Example 19, wherein: an input port of the first RIN detector is in optical communication with an output port of first intensity modulator through the third coupling waveguide and the first waveguide branch, wherein a measured intensity fluctuation is used as an input error signal to feed into the first RIN servo loop, wherein an output signal of the first RIN servo loop is used to adjust the first intensity modulator to reduce an intensity noise on the CCW beam launched into the first intensity modulator; an input port of the second RIN detector is in optical communication with an output port of the second intensity modulator through the fourth coupling waveguide and the third waveguide branch, wherein a second measured intensity fluctuation is used as an input error signal to feed into the second RIN servo loop, wherein an output signal of the second RIN servo loop is used to adjust the second intensity modulator to reduce an intensity noise on the CW beam launched into the second intensity modulator; an input port of the rate detector is in optical communication with an output port of the first intensity modulator through the third coupling waveguide and the second waveguide branch, and is in optical communication with an output port of the second intensity modulator through the fourth coupling waveguide and the fourth waveguide branch; wherein the second waveguide branch and the fourth waveguide branch are coupled together at the input port of the rate detector.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A gyroscope comprising:
   a light source configured to emit a light beam with a broadband spectrum;
   a first waveguide arrangement in optical communication with the light source, the first waveguide arrangement configured to split the light beam into a counterclockwise (CCW) beam and a clockwise (CW) beam;
   a first phase modulator optically coupled to the first waveguide arrangement, the first phase modulator configured to receive the CCW beam and provide a phase modulation or frequency shift to the CCW beam;
   a second phase modulator optically coupled to the first waveguide arrangement, the second phase modulator configured to receive the CW beam and provide a phase modulation or frequency shift to the CW beam;
   an optical resonator in optical communication with the first phase modulator and the second phase modulator through the first waveguide arrangement, wherein the CCW beam is optically coupled into the optical resonator and propagates in a CCW direction in the optical resonator, and the CW beam is optically coupled into the optical resonator and propagates in a CW direction in the optical resonator;
   a second waveguide arrangement optically coupled to the optical resonator, the second waveguide arrangement configured to receive the CCW beam and the CW beam transmitted from the optical resonator;
   a first relative intensity noise (RIN) detector optically coupled to the second waveguide arrangement and configured to receive the CCW beam;
   a second RIN detector optically coupled to the second waveguide arrangement and configured to receive the CW beam;
   a rate detector optically coupled to the second waveguide arrangement, the rate detector configured to receive combined portions of the CCW and CW beams from the second waveguide arrangement; and
   a rate calculation unit configured to receive a first intensity noise signal from the first RIN detector and a second intensity noise signal from the second RIN detector, the rate calculation unit further configured to receive a rate and intensity noise signal from the rate detector;
   wherein the rate calculation unit is operative to perform a RIN subtraction technique to reduce intensity noise limited Angle Random Walk (ARW), and to calculate a rotation rate signal for the gyroscope.

2. The gyroscope of claim 1, wherein in the RIN subtraction technique, the intensity noise signal is subtracted from the rate using intensity signals at a demodulation frequency provided by the first and second intensity noise signals from the first and second RIN detectors.

3. The gyroscope of claim 1, wherein the rate detector is operative to detect a Sagnac phase shift between the CW and CCW beams in the optical resonator caused by rotation of the gyroscope.

4. The gyroscope of claim 1, wherein the light source comprises an amplified spontaneous emission device, an Erbium-doped fiber amplifier, a superluminescent diode, or two or more superluminescent diodes having different center wavelengths.

5. The gyroscope of claim 1, wherein the optical resonator comprises a waveguide ring resonator.

6. The gyroscope of claim 1, wherein the optical resonator comprises a fiber ring resonator.

7. The gyroscope of claim 1, wherein the optical resonator comprises a planar waveguide ring resonator.

8. The gyroscope of claim 1, further comprising:
a first optical isolator optically coupled to the first waveguide arrangement between the first phase modulator and the optical resonator; and
a second optical isolator optically coupled to the first waveguide arrangement between the second phase modulator and the optical resonator.

9. The gyroscope of claim 8, wherein the first waveguide arrangement comprises:
a first waveguide optically coupled between the light source and the first phase modulator;
a second waveguide optically coupled between the light source and the second phase modulator;
a third waveguide optically coupled between the first phase modulator and the first optical isolator;
a fourth waveguide optically coupled between the second phase modulator and the second optical isolator; and
a first coupling waveguide optically coupled to the optical resonator at a first coupling region on a first side of the optical resonator;
wherein the first optical isolator and the second optical isolator are in optical communication with the optical resonator through the first coupling waveguide.

10. The gyroscope of claim 9, wherein the second waveguide arrangement comprises:
a second coupling waveguide optically coupled to the optical resonator at a second coupling region on a second side of the optical resonator;
wherein the second coupling waveguide is split into a first waveguide branch and a second waveguide branch at a third coupling region, and split into a third waveguide branch and a fourth waveguide branch at a fourth coupling region;
wherein the CW and CCW beams are transmitted from the optical resonator at the second coupling region, which rejects any light that does not overlap with resonance peaks of the optical resonator.

11. The gyroscope of claim 10, wherein:
the first RIN detector is in optical communication with the optical resonator through the second coupling waveguide and the first waveguide branch;
the second RIN detector is in optical communication with the optical resonator through the second coupling waveguide and the third waveguide branch; and
the rate detector is in optical communication with the optical resonator through the second coupling waveguide, the second waveguide branch, and the fourth waveguide branch;
wherein the second waveguide branch and the fourth waveguide branch are coupled together at an input port of the rate detector.

12. The gyroscope of claim 1, further comprising an optical isolator optically coupled between the light source and the first waveguide arrangement.

13. The gyroscope of claim 12, wherein the first waveguide arrangement comprises:
a first waveguide optically coupled between the optical isolator and the first phase modulator;
a second waveguide optically coupled between the optical isolator and the second phase modulator; and
a first coupling waveguide optically coupled to the optical resonator at a first coupling region on a first side of the optical resonator;
wherein the first phase modulator and the second phase modulator are in optical communication with the optical resonator through the first coupling waveguide.

14. The gyroscope of claim 13, wherein the second waveguide arrangement comprises:
a second coupling waveguide optically coupled to the optical resonator at a second coupling region on a second side of the optical resonator;
wherein the second coupling waveguide is split into a first waveguide branch and a second waveguide branch at a third coupling region, and split into a third waveguide branch and a fourth waveguide branch at a fourth coupling region.

15. The gyroscope of claim 14, wherein:
the first RIN detector is in optical communication with the optical resonator through the second coupling waveguide and the first waveguide branch;
the second RIN detector is in optical communication with the optical resonator through the second coupling waveguide and the third waveguide branch; and
the rate detector is in optical communication with the optical resonator through the second coupling waveguide, the second waveguide branch, and the fourth waveguide branch;
wherein the second waveguide branch and the fourth waveguide branch are coupled together at an input port of the rate detector.

* * * * *